United States Patent
Szita et al.

(10) Patent No.: US 11,508,403 B1
(45) Date of Patent: Nov. 22, 2022

(54) REDUCING THE EFFECT OF ACTUATOR CROSS-COUPLING IN SPLIT ACTUATOR DRIVES

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Gabor Szita, Mountain View, CA (US); Anton Gerasimov, Santa Clara, CA (US); Jiangang Liang, Saratoga, CA (US); Gary W. Calfee, Santa Clara, CA (US)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/357,799

(22) Filed: Jun. 24, 2021

(51) Int. Cl.
  *G11B 5/596* (2006.01)
  *G11B 5/55* (2006.01)
  *G11B 19/20* (2006.01)

(52) U.S. Cl.
  CPC ............ *G11B 5/553* (2013.01); *G11B 5/5573* (2013.01); *G11B 5/5578* (2013.01); *G11B 19/2009* (2013.01)

(58) Field of Classification Search
  None
  See application file for complete search history.

(56) References Cited

U.S. PATENT DOCUMENTS

| | | | |
|---|---|---|---|
| 6,236,032 B1 * | 5/2001 | Kamiyama | G11B 21/03 |
| 7,385,781 B1 | 6/2008 | Craig et al. | |
| 7,710,683 B2 | 5/2010 | Craig et al. | |
| 10,049,691 B1 * | 8/2018 | Gaertner | G11B 5/5578 |
| 10,192,576 B1 | 1/2019 | Gaertner et al. | |
| 10,741,210 B1 * | 8/2020 | Hillukka | G11B 19/2054 |
| 10,762,920 B2 | 9/2020 | Sakamoto et al. | |
| 2005/0041542 A1 * | 2/2005 | Kobayashi | G11B 7/08505 |
| 2008/0019224 A1 * | 1/2008 | Ishibashi | G11B 7/121 |

* cited by examiner

*Primary Examiner* — Peter Vincent Agustin
(74) *Attorney, Agent, or Firm* — Kim & Stewart LLP

(57) ABSTRACT

Motion of a first actuator in a multi-actuator drive is prevented from affecting a second actuator in the drive or from being affected by the second actuator. A coupling coordinator generates a hold command for the second actuator based on an operation to be carried out using the first actuator, where the hold command is generated before commands to carry out the operation are issued. The hold command may cause an aggressor actuator in the drive to halt a disturbance-generating operation being performed by the aggressor actuator or delay initiation of such an operation that is to be performed by the aggressor actuator. The hold command may cause a victim actuator in the drive to pause the execution of a sensitive operation being performed by the victim actuator or delay initiation of such an operation that is to be performed by the victim actuator.

16 Claims, 9 Drawing Sheets

REDUCING THE EFFECT OF ACTUATOR CROSS-COUPLING IN SPLIT ACTUATOR DRIVES

BACKGROUND

Magnetic hard disk drives (HDDs) have been employed in information technology as a low-cost means for providing random access to large quantities of data. As the need for data storage has expanded, the areal density of information stored in HDDs has continuously increased. In addition to high storage capacity, the ability of an HDD to access stored data quickly is also important. To meet the ever-increasing requirements for high access performance and faster throughput, HDDs have been configured with multiple rotary actuators and associated read/write channels that are designed to operate simultaneously. Thus, each rotary actuator enables the independent positioning of one or more magnetic heads for reading and writing data, thereby greatly increasing the throughput of such HDDs.

One drawback to the use of independent rotary actuators is that the mechanical interaction between such actuators can affect positioning accuracy of the magnetic heads when both actuators are in motion. For example, when one actuator is seeking to a targeted data track, the high accelerations and changes in acceleration of the actuator can generate vibrations which will significantly affect the positioning accuracy of the other actuator while the other actuator is performing sensitive operations, such as writing data, performing delicate calibration procedures, writing precisely positioned servo information, and the like. Consequently, there is a need in the art for reducing the effect of one actuator in a multi-actuator drive on the positioning accuracy of another actuator in the multi-actuator drive.

SUMMARY

One or more embodiments provide systems and methods for preventing motion of a first actuator in a multi-actuator drive from affecting a second actuator in the drive or, alternatively, from being affected by the second actuator. In the embodiments, a coupling coordinator generates a hold command for the controller of the second actuator based on an operation to be carried out using the first actuator, where the hold command is generated before commands to carry out the operation are issued. In some embodiments, the second actuator is a so-called "aggressor actuator," and the hold command causes the controller of the aggressor actuator to halt a disturbance-generating operation being performed by the second actuator or delay initiation of such an operation that is to be performed by the second actuator. In some embodiments, the second actuator is a so-called "victim actuator," and the hold command causes the controller of the victim actuator to pause the execution of a sensitive operation being performed by the second actuator or delay initiation of such an operation that is to be performed by the second actuator. In some embodiments, control logic associated with the coupling coordinator is included in a first servo system for the first actuator and a second servo system for the second actuator. Alternatively or additionally, in some embodiments, control logic associated with the coupling coordinator is external to the first servo system and the second servo system.

A method of reducing cross-coupling between actuators in a split actuator drive, wherein the actuators include a first actuator that is controlled by a first controller and a second actuator that is controlled by a second controller, includes: generating a hold command for the second controller based on an operation to be carried out using the first actuator, before issuing commands to carry out the operation; issuing the hold command to the second controller; and after issuing the hold command to the second controller, issuing the commands to carry out the operation.

According to an embodiment, a disk device includes: a magnetic disk; first and second heads; a first arm to which the first head is mounted; a second arm to which the second head is mounted; a first control circuit configured to generate a first control signal for moving the first arm in response to a first position signal generated by the first head; and a second control circuit configured to generate a second control signal for moving the second arm in response to a second position signal generated by the second head, wherein the first control circuit is configured to: generate a hold command for the second control circuit based on an operation to be carried out using the first head, before issuing commands to carry out the operation; issue the hold command to the second control circuit; and after issuing the hold command to the second control circuit, issuing the commands to carry out the operation.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
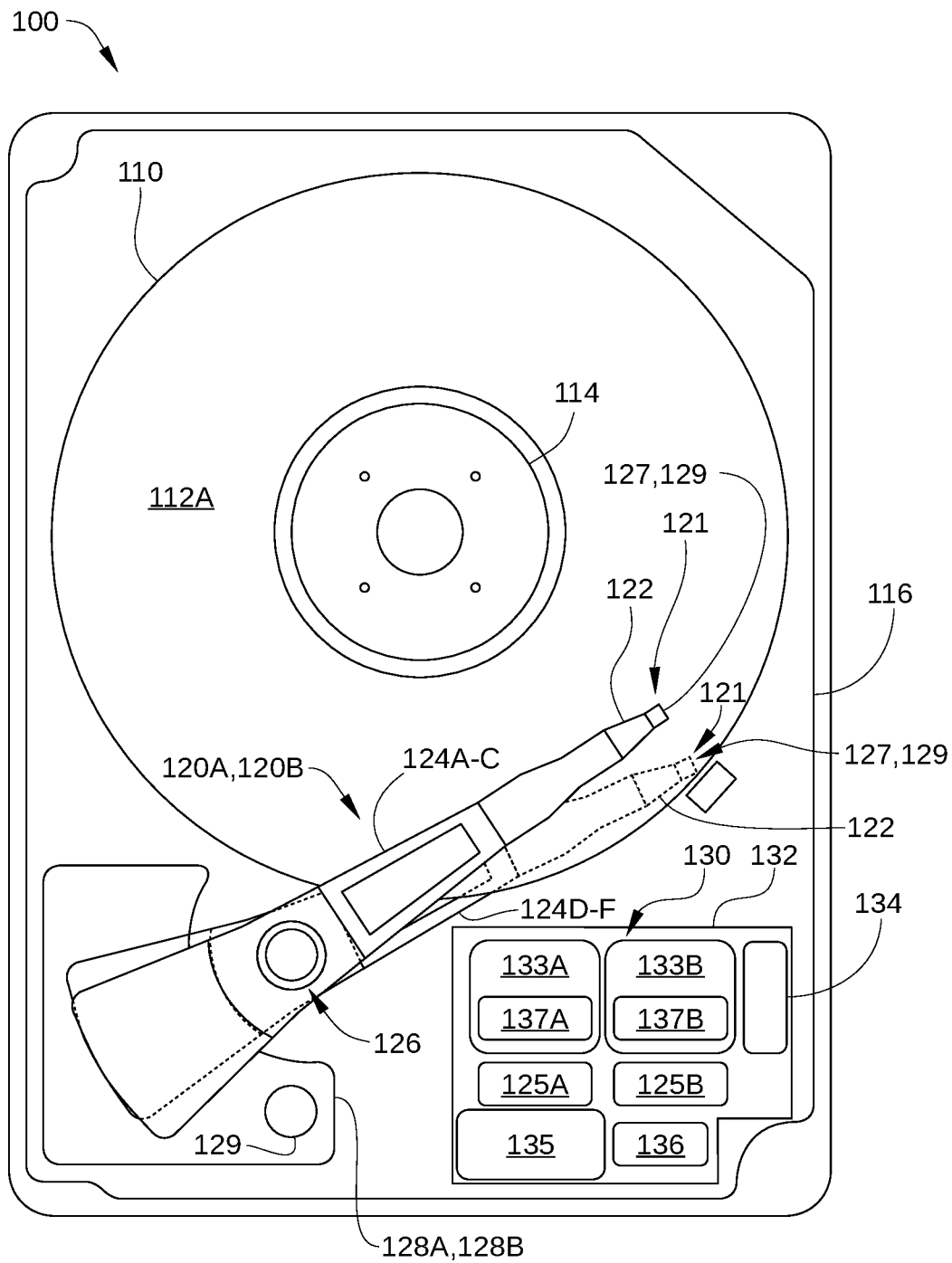
FIG. 1 is a schematic view of an exemplary hard disk drive (HDD), according to an embodiment.

FIG. 1 is a schematic view of an exemplary hard disk drive (HDD) 100, according to one embodiment. For clarity, HDD 100 is illustrated without a top cover. HDD 100 is a multiple actuator drive (in particular a split-actuator drive), and includes storage disks 110, each including one or two recording surfaces on which a plurality of concentric data storage tracks are disposed. In FIG. 1, only the top recording surface 112A of storage disk 110 is visible. The storage disks 110 are coupled to and rotated by a spindle motor 114 that is mounted on a base plate 116. Two actuator arm assemblies 120A and 120B are also mounted on base plate 116, and each of the assemblies includes arm-mounted sliders 121 with magnetic read/write heads 127 that read data from and write data to the data storage tracks of an associated recording surface, such as recording surface 112A.

In the embodiments illustrated herein, actuator arms 124A-124C are included in actuator arm assembly 120A, and actuator arms 124D-124F are included in actuator arm assembly 120B. Actuator arm assembly 120A and the actuator arms 124A-124C included therein are rotated together about a bearing assembly 126 by a voice coil motor (VCM) 128A independently from actuator arm assembly 120B. Likewise, actuator arm assembly 120B and the actuator arms 124D-124F included therein are rotated together about bearing assembly 126 by a VCM 128B independently from actuator arm assembly 120A. Thus, each of VCMs 128A and 128B moves a group of the sliders 121 and read/write heads 127 radially relative to a respective recording surface of a storage disk 110 included in HDD 100, thereby providing radial positioning of a corresponding read/write head 127 over a desired concentric data on a recording surface, for example on recording surface 112A. Spindle motor 114, the read/write heads 127, and VCMs 128A and 128B are coupled to electronic circuits 130, which are mounted on a printed circuit board 132.

Electronic circuits 130 include a system-on-chip (SoC) 133A, an SoC 133B, a random-access memory (RAM) 134 (which may be a dynamic RAM and is used as one or more data buffers), motor-driver chips 125A and 125B, and/or a flash memory device 135. In some embodiments, electronic circuits 130 include a flash manager device 136 associated with flash memory device 135. In some embodiments, SoC 133A is a microprocessor-based controller implemented as a single chip that includes read channel 137A and other electronic devices associated with VCM 128A. Similarly, SoC 133B is a microprocessor-based controller implemented as a single chip that includes read channel 137B and other electronic devices associated with VCM 128B. Motor-driver chip 125A accepts commands from SoC 133A and drives VCM 128A and spindle motor 114, and motor-driver chip 125B accepts commands from SoC 133B and drives VCM 128B. In the embodiment illustrated in FIG. 1, HDD 100 is shown with multiple motor-driver chips 125A and 125B that drive spindle motor 114 and VCMs 128A and 128B. In other embodiments, HDD 100 includes a single motor-driver chip that drives spindle motor 114 and VCMs 128A and 128B. Further, in other embodiments, any other partition of the jobs of spindle motor control, actuator control, and microactuator control can be implemented. Via a preamplifier (not shown), read/write channel 137A communicates with read/write heads 127 of actuator arm assembly 120A and read/write channel 137B communicates with read/write heads 127 of actuator arm assembly 120B. The preamplifiers are mounted on a flex-cable, which is mounted on either base plate 116, one of actuators 120A or 120B, or both.

When data are transferred to or from a particular recording surface of HDD 100, one of the actuator arm assemblies 120A or 120B moves in an arc between the inner diameter (ID) and the outer diameter (OD) of the storage disk 110. The actuator arm assembly accelerates in one angular direction when current is passed in one direction through the voice coil of the corresponding VCM and accelerates in an opposite direction when the current is reversed, thereby allowing coarse control of the radial position of the actuator arm assembly and the attached read/write head with respect to the particular storage disk 110.

In some embodiments, fine radial positioning of each read/write head 127 is accomplished with a respective microactuator 129. The microactuator 129 for each read/write head 127 is mechanically coupled to the actuator arm 124 that corresponds to the read/write head 127. Each microactuator 129 typically includes one or more piezoelectric elements and is configured to move a corresponding read/write head 127 radially a small distance, for example on the order of a few tens or hundreds of nanometers. When employed together, microactuators 129 and voice coil motors 128A and 128B are sometimes referred to as dual-stage actuators, where voice coil motor 128A or 128B is the prime mover and each microactuator 129 is a second-stage actuator. Dual-stage actuators enable the servo system of HDD 100 to attain more accurate tracking control.

In some embodiments, each microactuator 129 is mounted on a respective flexure arm 122, at a gimbal between the respective flexure arm 122 and the corresponding slider 121. In such embodiments, each microactuator 129 rotates the corresponding slider 121, causing radial motion (relative to corresponding recording surface) of the corresponding read/write head 127. Alternatively or additionally, in some embodiments, each microactuator 129 is mounted on an end of an actuator arm 124 or on the flexure arm, itself, and moves the flexure arm 122 through a relatively large arc, for example on the order of a hundred track widths. In yet other embodiments, each microactuator 129 includes a first piezoelectric or other movable element at the gimbal between the respective flexure arm 122 and the corresponding slider 121 and a second piezoelectric or other movable element at the end of the actuator arm 124 or on the flexure arm. In such embodiments, each read/write head 127 is provided with three-stage actuation in the radial direction.

In the embodiment illustrated in FIG. 1, only one slider 121, one flexure arm 122, and one read/write head 127 are shown for actuator arm assembly 120A, and only one slider 121, one flexure arm 122, and one read/write head 127 are shown for actuator arm assembly 120B. In other embodiments, each of actuator arm assemblies 120A and 120B can include a plurality of sliders, flexure arms, and read/write heads. Further, in some embodiments, HDD 100 can include more than two actuator arm assemblies, each rotated about bearing assembly 126 by a respective VCM independently from each other. In other embodiments, additional actuators may rotate about other bearing assemblies.

Figure 2:
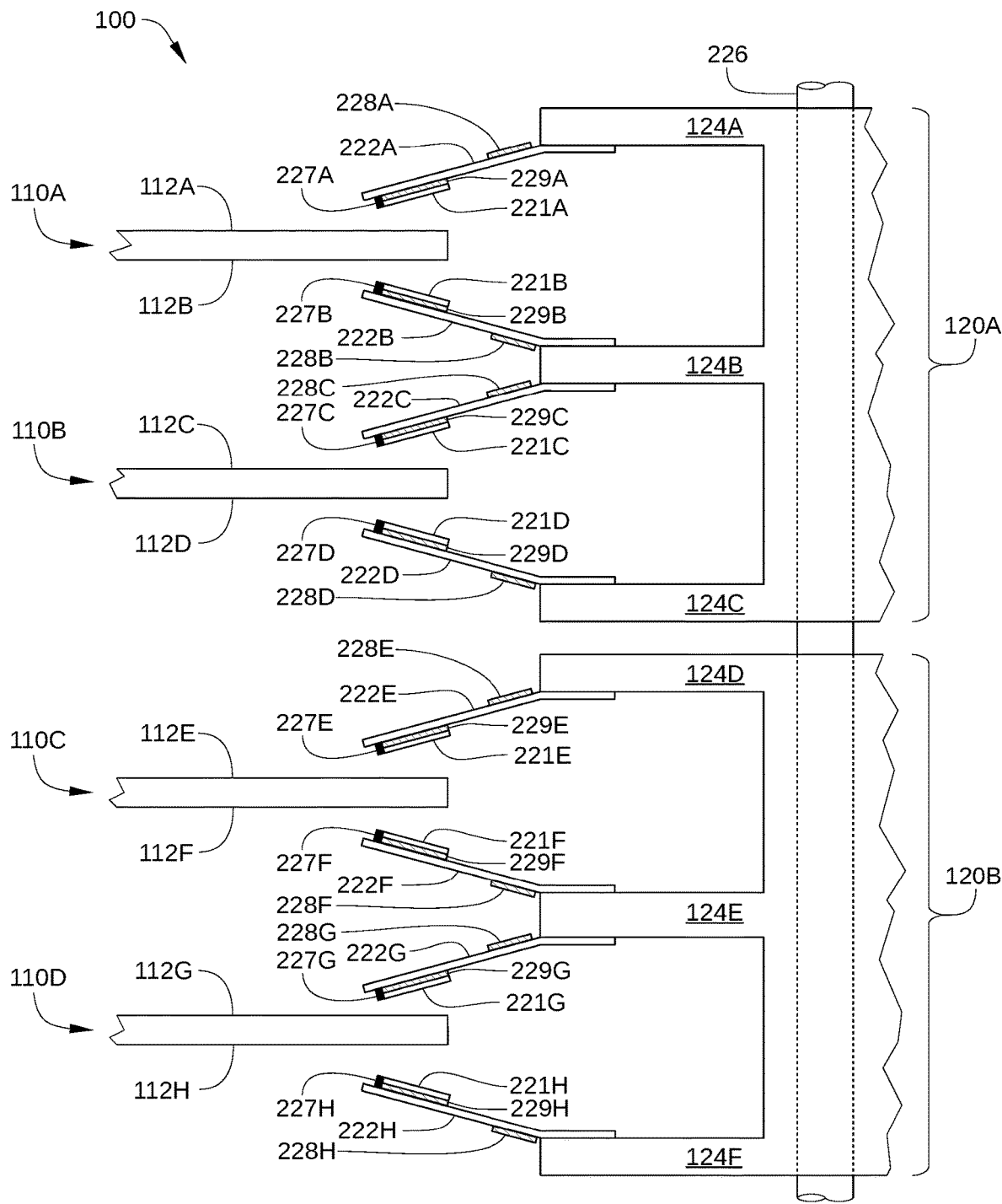
FIG. 2 schematically illustrates a partial side-view of multiple storage disks and two independent actuator arm assemblies of the HDD of FIG. 1.

FIG. 2 schematically illustrates a partial side-view of multiple storage disks 110A-110D and two independent actuator arm assemblies 120A and 120B of HDD 100, according to an embodiment. The recording surfaces of multiple storage disks 110A and 110B are each accessed by one of the read/write heads included in the independent actuator arm assembly 120A (e.g., read/write heads 227A, 227B, 227C, and 227D), and the recording surfaces of multiple storage disks 110C and 110D are each accessed by the read/write heads included in the independent actuator arm assembly 120B (e.g., read/write heads 227E, 227F, 227G, and 227H). Thus, in the embodiment illustrated in FIG. 2, HDD 100 is configured with multiple storage disks 110A-110D having a total of eight recording surfaces 112A-

112H and multiple read/write heads 227A-227H, each corresponding to one of these recording surfaces. Specifically, in the embodiment illustrated in FIG. 2, HDD 100 includes: a storage disk 110A with recording surfaces 112A and 112B; a storage disk 110B with recording surfaces 112C and 112D; a storage disk 110C with recording surfaces 112E and 112F; and a storage disk 110D with recording surfaces 112G and 112H. Thus, read/write head 227A reads data from and writes data to recording surface 112A, read/write head 227B reads data from and writes data to corresponding recording surface 112B, and so on.

Read/write heads 227A-227H are disposed on sliders 221A-221H, respectively, and sliders 221A-221H (referred to collectively herein as sliders 221) are respectively coupled to actuator arms 124A-124F via flexure arms 222A-222H (referred to collectively herein as flexure arms 222) as shown. In some embodiments, each of sliders 221A-221H is mounted on a corresponding one of flexure arms 222 via a microactuator 229A-229H (referred to collectively herein as microactuators 229), such as a second-stage micro-actuator (MA) that includes two lead zirconate titanate piezoelectric actuators attached to a baseplate of the corresponding flexure arm 222. Alternatively, in some embodiments, each of sliders 221A-221H is mounted directly on a corresponding one of flexure arms 222.

In the embodiment illustrated in FIG. 2, flexure arm 222A is coupled to an actuator arm 124A, flexure arms 222B and 222C are coupled to an actuator arm 124B, flexure arm 222D is coupled to an actuator arm 124C, flexure arm 222E is coupled to an actuator arm 124D, flexure arms 222F and 222G are coupled to an actuator arm 124E, and flexure arm 222H is coupled to an actuator arm 124F. Actuator arms 124A-124F are referred to collectively herein as actuator arms 124. In the embodiment illustrated in FIG. 2, each of microactuators 228A-228H (referred to collectively herein as microactuators 228) is disposed at a base of flexure arms 222A-222H, respectively, i.e., at an end of one of actuator arms 124. Alternatively or additionally, in some embodiments, microactuators 229A-229H can be disposed proximate sliders 221A-221H, respectively, i.e., at a tip of flexure arms 222A-222H, respectively. In embodiments in which microactuators 229 are disposed proximate sliders 221, each of microactuators 229 can include a gimbal microactuator. In either case, each of microactuators 229 and/or 228 compensates for perturbations in the radial position of sliders 221, so that read/write heads 227A-227H follow the proper data track on recording surfaces 112. Thus, microactuators 229 can compensate for vibrations of the disk, inertial events such as impacts to HDD 100, and irregularities in recording surfaces 112 or in the written servo-pattern.

Actuator arms 124A-124C are included in actuator arm assembly 120A, and actuator arms 124D-124F are included in actuator arm assembly 120B. In an embodiment of the invention, actuator arm assemblies 120A and 120B are independently controlled and both rotate about bearing assembly 126 (which includes a same shaft axis 226).

In positioning one of read/write heads 227A-227H over a corresponding recording surface (i.e., one of recording surfaces 112A-112H), the servo system determines an appropriate current to drive through the voice coil of the appropriate voice coil motor (i.e., either VCM 128A or 128B), and drives said current using a current driver and associated circuitry, e.g., included in motor-driver chip 125A or 125B. Typically, the appropriate current is determined based in part on a position feedback signal of the read/write head 127, i.e., a position error signal (PES). The PES is typically generated by using servo patterns included in the servo wedges on the recording surface as a reference. One embodiment of such a recording surface 112 is illustrated in FIG. 3.

Figure 3:
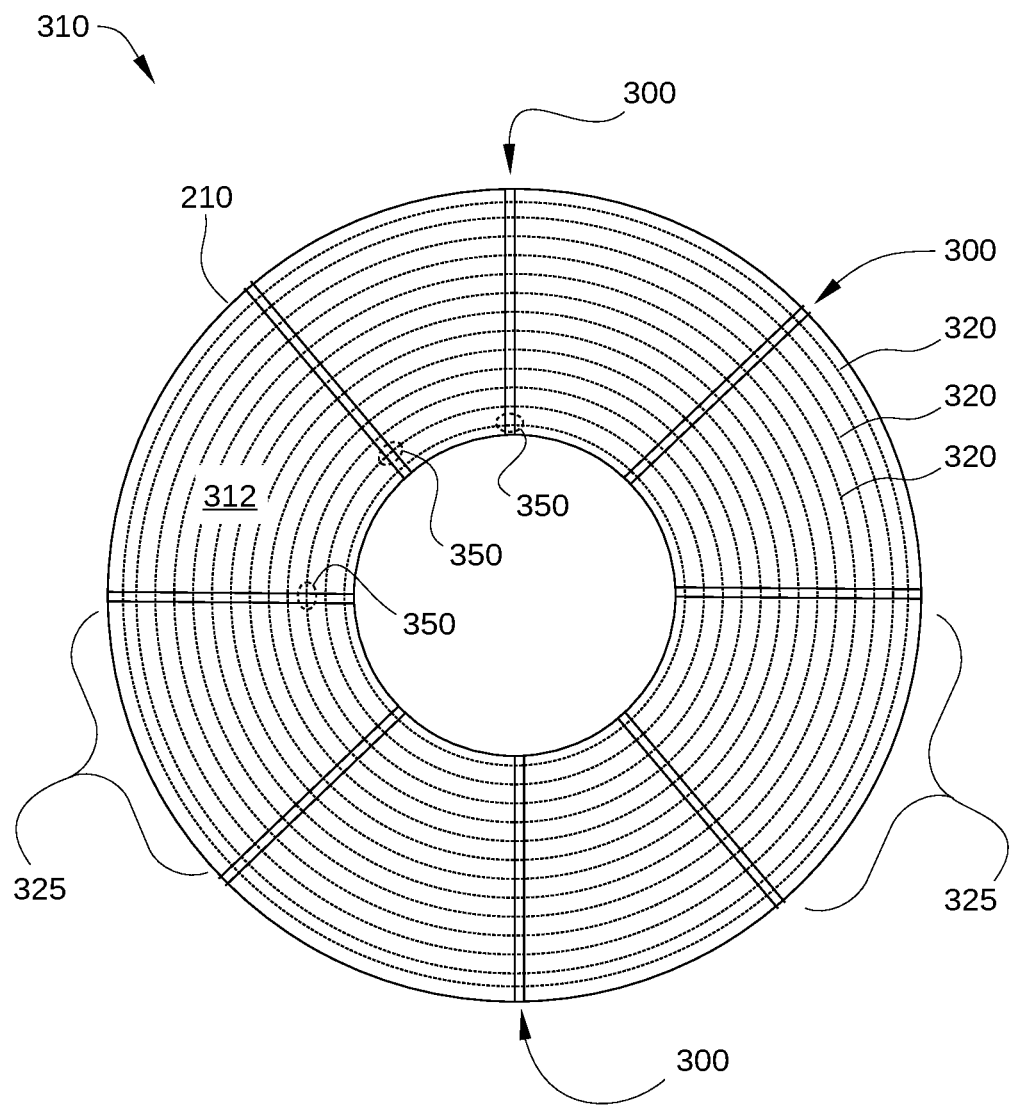
FIG. 3 illustrates a recording surface of a storage disk with servo wedges and concentric data storage tracks formed thereon, according to an embodiment.

FIG. 3 illustrates a recording surface 312 of a storage disk 310 with servo wedges 300 and concentric data storage tracks 320 formed thereon, according to an embodiment. Recording surface 312 can be any of recording surfaces 112A-112H in FIG. 2. Servo wedges 300 may be written on recording surface 312 by either a media writer, or by HDD 100 itself via a self-servo-write (SSW) process. Servo wedges 300 are typically radially aligned. In practice, servo wedges 300 may be somewhat curved. For example, servo wedges 300 may be configured in a spiral pattern that mirrors the path that would be followed by a corresponding read/write head 127 (shown in FIG. 1) if the read/write head 127 were to be moved across the stroke of one of actuator arm assemblies 120A or 120B while storage disk 310 is not spinning. Such a curved pattern advantageously results in the wedge-to-wedge timing being independent of the radial position of the read/write head 127. For simplicity, servo wedges 300 are depicted as substantially straight lines in FIG. 3. Each servo wedge 300 includes a plurality of servo sectors 350 containing servo information that defines the radial position and track pitch, i.e., spacing, of data storage tracks 320.

Data storage tracks 320 for storing data are located in data sectors 325, and are positionally defined by the servo information written in servo sectors 350. The region between two servo sectors may contain more than, equal to, or less than one data sector, including the possibility of fractional data-sectors. Each servo sector 350 encodes a reference signal that is read by the read/write head 127 as the read/write head 127 passes over the servo sector. Thus, during read and write operations, the read/write head 127 can be positioned above a desired data storage track 320. Typically, the actual number of data storage tracks 320 and servo wedges 300 included on recording surface 312 is considerably larger than that illustrated in FIG. 3. For example, recording surface 312 may include hundreds of thousands of concentric data storage tracks 320 and hundreds of servo wedges 300.

As noted previously, when one actuator of a multi-actuator HDD (the so-called "aggressor actuator") performs certain disturbance-generating operations, cross-actuator coupling can generate vibrations which significantly affect the positioning accuracy of the other actuator (the so-called "victim actuator"). Thus, when the victim actuator is performing a position-sensitive operation while the aggressor actuator is performing a disturbance-generating operation, the positioning accuracy of the victim actuator is likely to be degraded and the position-sensitive operation can be deleteriously affected. Examples of disturbance-generating operations include operations that result in high VCM current, such as operations that include a long, velocity-based seek, operations that involve switching from back-electromotive force (back-EMF) control to track-seeking control, and operations that include motions of a VCM that are implemented via high accelerations and/or changes in acceleration of the aggressor actuator. Examples of disturbance-generating operations may further include operations that can result in generation of mechanical disturbances, such as a "park heads" operation, an "unpark heads" operation, etc. Examples of position-sensitive operations include performing a long sequential write, writing clock information, and writing servo information, such as servo bursts and/or a servo spiral. Examples of position-sensitive operations may further include certain calibration operations, such as, a control loop bandwidth calibration, a repeatable runout calibration, and the like.

According to various embodiments described herein, a coupling coordinator in a split- (or multi-) actuator drive (e.g., HDD 100) generates a hold command to prevent motion of a first actuator in the drive from affecting a second actuator in the drive or, alternatively, to prevent the first actuator from being affected by the second actuator. In the embodiments, the hold command is based on an operation to be carried out using the first actuator in the drive, and is generated before commands to carry out the operation are issued. Thus, in embodiments in which the first actuator is the "aggressor actuator," the hold command causes the controller of the victim actuator to pause the execution of a sensitive operation being performed by the second actuator, delay initiation of such an operation that is to be performed by the second actuator, and/or initiate another operation that is not as sensitive to disturbances from the first actuator. Conversely, in embodiments in which the first actuator is the "victim actuator," the hold command causes the controller of the aggressor actuator to halt a disturbance-generating operation being performed by the second actuator, delay initiation of such an operation that is to be performed by the second actuator, and/or initiate another operation that causes less of a disturbance to the first actuator.

Figure 4:
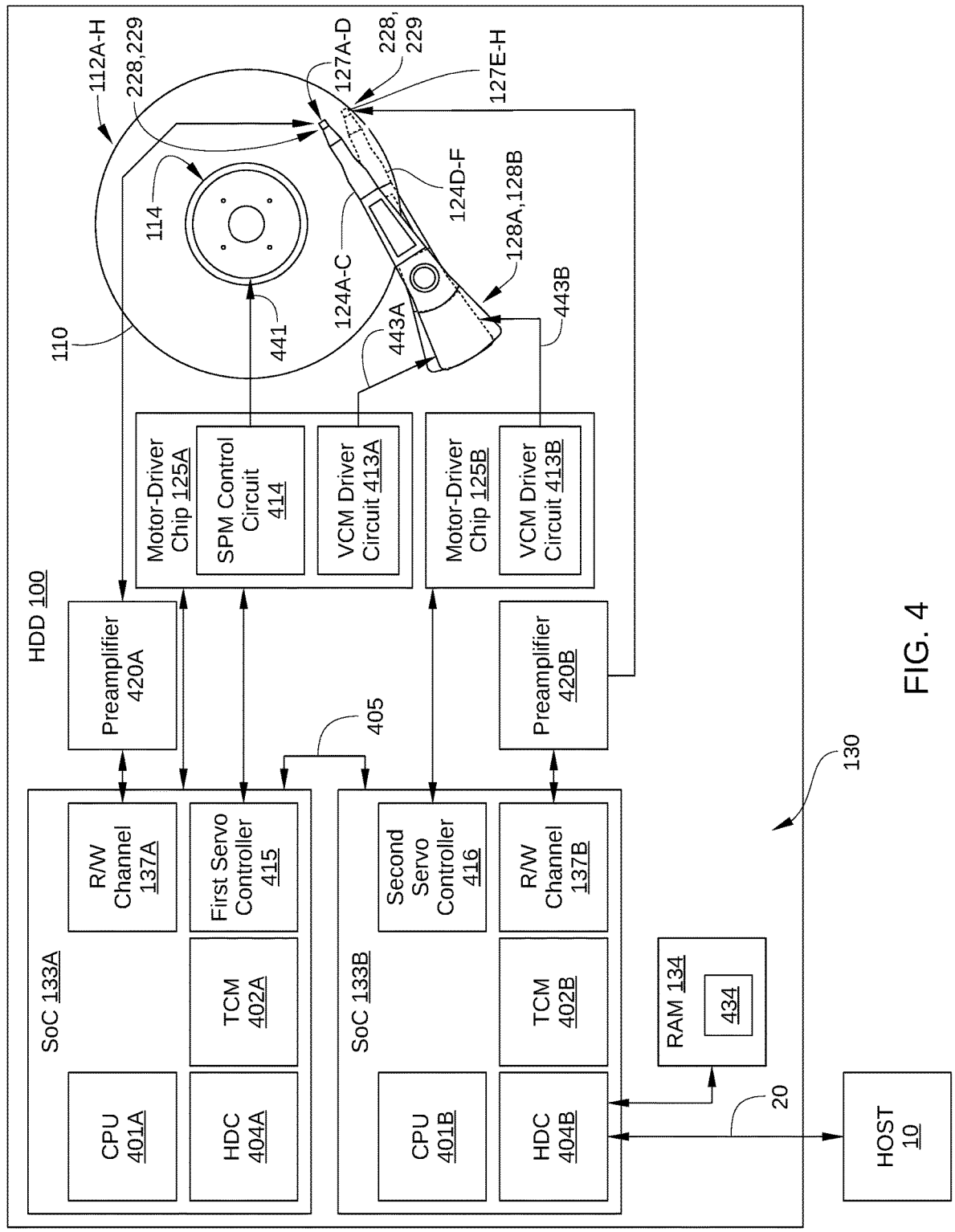
FIG. 4 illustrates an operational diagram of the HDD of FIG. 1, with some elements of electronic circuits and a motor-driver chip shown configured according to one embodiment.

FIG. 4 illustrates an operational diagram of HDD 100 configured to implement various embodiments. In the embodiment illustrated in FIG. 4, a specific configuration of certain elements of electronic circuits 130 is described. In other embodiments, any other suitable arrangement or configuration of electronic circuits 130 may be employed that is operable to implement one or more embodiments described herein. For example, in the embodiment illustrated in FIG. 4, HDD 100 is configured with a first microprocessor-based controller (SoC 133A) that is associated with VCM 128A and a second microprocessor-based controller (SoC 133B) that is associated with VCM 128B. In other embodiments, various elements of SoC 133A and/or SoC 133B may be configured in a single SoC and/or implemented as stand-alone chips included in electronic circuits 130.

HDD 100 is connected to a host 10, such as a host computer, via a host interface 20, such as a serial advanced technology attachment (SATA) bus or a Serial Attached Small Computer System Interface (SAS) bus. As shown, electronic circuits 130 of HDD 100 include SoC 133A, SoC 133B, RAM 134, motor driver chip 125A communicatively coupled to SoC 133A, and motor driver chip 125B communicatively coupled to SoC 133B.

In the embodiment illustrated in FIG. 4, SoC 133A includes one or more central processing units (CPUs) 401A or other processors, a tightly-coupled memory (TCM) 402A, a first servo controller 415, a hard disk controller (HDC) 404A, and read/write channel 137A, and SoC 133B includes one or more central processing units (CPUs) 401B or other processors, a TCM 402B, a second servo controller 416, an HDC 404B, and read/write channel 137B. TCM 402A is disposed proximate CPU 401A, so that CPU 401A suffers either a small number and/or zero wait states when fetching data therefrom. Similarly, TCM 402B is disposed proximate CPU 401B. In some embodiments, TCM 402A and TCM 402B each include static random-access memory (SRAM), ferroelectric RAM (FRAM), and/or other suitable high-speed memory.

In some embodiments, communications between SoC 133A and SoC 133B are enabled at least in part with a bus 405 that communicatively couples SoC 133A and SoC 133B. In such embodiments, bus 405 enables CPU 401A to read from and write to at least some commonly accessible memory locations associated with SoC 133B and CPU 401B to read from and write to at least some commonly accessible memory locations associated with SoC 133A. Such memory locations may include one or more of a shared memory region 434 included in RAM 134, specific registers or other memory locations in TCM 402A, specific registers or other memory locations in TCM 402B, and/or other specifically designated memory locations (not shown) within SoC 133A and SoC 133B.

Motor-driver chip 125A includes VCM driver circuit 413A, MA driver circuits (not shown), and a spindle motor (SPM) control circuit 414, and motor-driver chip 125B includes VCM driver circuit 413B and MA driver circuits (not shown). Alternatively, in some embodiments, HDD 100 includes a single motor driver chip. In such embodiments, the single motor driver driver chip is configured for controlling spindle motor 114, VCM 128A, and VCM 128.

VCM driver circuit 413A of motor-driver chip 125A generates an amplified control signal 443A in response to control signals (referred to herein as VCM commands) from first servo controller 415, and a VCM driver circuit 413B of motor-driver chip 125B generates an amplified control signal 443B in response to control signals (VCM commands) from second servo controller 416. Control signals 443A enable execution of disk access commands received from host 10 that are to be executed by a first servo system of HDD 100 that includes VCM 128A. Control signals 443B enable execution of disk access commands received from host 10 that are to be executed by a second servo system of HDD 100 that includes VCM 128B.

Generally, RAM 134 is shared by SoC 133A and SoC 133B, and therefore can be accessed by CPU 401A or 401B. In the embodiment illustrated in FIG. 4, RAM 134 is directly coupled to one SoC of HDD 100 (e.g., SoC 133B), while other SoCs of HDD 100 (e.g., SoC 133A) access RAM 134 via bus 405. In some embodiments, CPU 401A communicates a hold command to CPU 401B and vice-versa via one or more "mailbox" memory locations in RAM 134. In such embodiments, RAM 134 includes a shared memory region 434 that is accessed by CPU 401A and CPU 401B. In the embodiment illustrated in FIG. 4, HDD 100 includes a single RAM 134 that is external to SoC 133A and SoC 133B. In other embodiments, HDD 100 may include any other suitable configuration of RAM 134, such as a DRAM device integrated in SoC 133A and another DRAM device integrated in SoC 133B, or a commonly accessible DRAM device that is included in a separate package mounted on circuit board 132. In other embodiments, CPU 401A and CPU 401B communicate with each other by accessing a suitable memory, such as a memory in SoC 133A that is accessible by CPU 401B and/or a memory in SoC 133B that is accessible by CPU 401A.

HDD 100 further includes a preamplifier 420A associated with read/write heads 127A-127D and a preamplifier 420A associated with read/write heads 127E-127H. Preamplifiers 420A and 420B can be each mounted on actuator arm assemblies 120A and 120B or elsewhere within the head and disk assembly (HDA) of HDD 100. Preamplifier 420A supplies a write signal (e.g., current) to read/write head 127A in response to write data input from read/write channel 137A. Similarly, preamplifier 420B supplies a write signal (e.g., current) to read/write head 127B in response to write data input from read/write channel 137B. In addition, preamplifier 420A amplifies a read signal output from to read/write head 127A and transmits the amplified read signal to read/write channel 137A, and preamplifier 420B amplifies a read signal output from to read/write head 127B and transmits the amplified read signal to read/write channel 137B.

CPU 401A and CPU 401B control HDD 100, for example according to firmware stored in flash memory device 135 or another nonvolatile memory, such as portions of recording surfaces 112A-112H. For example, CPU 401A manages various processes performed by HDC 404A, read/write channel 137A, read/write heads 127A-127D, recording surfaces 112A-112D, and/or motor-driver chip 125A, while CPU 401B manages various processes performed by HDC 404B, read/write channel 137B, read/write heads 127E-127H, recording surfaces 112E-112H, and/or motor-driver chip 125B. Such processes include a writing process for writing data onto recording surfaces 112A-112H, a reading process for reading data from recording surfaces 112A-112H, various calibration processes, a self-servo-writing process, and the like.

In some embodiments, a first servo system of HDD 100 (e.g., CPU 401A, read/write channel 137A, preamplifier 420A, first servo controller 415, voice-coil motor 128A, and a suitable microactuator 228 or 229) performs positioning of a read/write head 127 included in actuator arm assembly 120A (e.g., read/write head 127A) over a corresponding recording surface (e.g., recording surface 112A), during which CPU 401A determines an appropriate current to drive through the voice coil of VCM 128A. Typically, the appropriate current is determined based in part on a position feedback signal of the read/write head, i.e., a position error signal (PES). Similarly, the second servo system of HDD 100 (e.g., CPU 401B, read/write channel 137B, preamplifier 420B, second servo controller 416, voice-coil motor 128B, and a suitable microactuator 228 or 229) performs positioning of a read/write head 127 included in actuator arm assembly 120B (e.g., read/write head 127D) over a corresponding recording surface (e.g., recording surface 112D), during which CPU 401B determines an appropriate current to drive through the voice coil of VCM 128B. Although one CPU for each actuator of HDD 100 is shown herein, in alternative embodiments, a single CPU may be employed to perform the operations of CPU 401A and CPU 401B.

Read/write channels 137A and 137B are signal processing circuits that encode write data input from HDC 404A and HDC 404B and output the encoded write data to respective preamplifiers 420A and 420B. Read/write channels 137A and 137B also decode read signals transmitted from respective preamplifiers 420A and 420B into read data that are respectively outputted to HDC 404A and HDC 404B. In some embodiments, read/write channels 137A and 137B each include a single read channel and a single write channel, whereas in other embodiments, read/write channels 137A and 137B each include multiple write channels and/or multiple read channels for read/write heads 127A-127H. In some embodiments, HDC 404A controls access to RAM 134 by CPU 401A and read/write channels 137A, and receives/transmits data from/to host 10. In some embodiments, such communications between HDC 404A, RAM 134, read/write channel 137A, and/or host 10 are enabled via SoC 133B and bus 405. In some embodiments, HDC 404B controls access to RAM 134 by CPU 401B, and read/write channel 137B. In some embodiments, such communications between HDC 404B, RAM 134, and/or read/write channel 137B are enabled via SoC 133B. HDC 404B receives/transmits data from/to host 10 via interface 20.

In the embodiment illustrated in FIG. 4, various links are shown between certain elements of HDD 100 for enablement of certain embodiments. In some embodiments, additional and/or alternative links between certain elements of HDD 100 may exist for operation of HDD 100, but are not shown for clarity and ease of description. Such additional and/or alternative links would be known to one of ordinary skill in the art.

Figure 5:
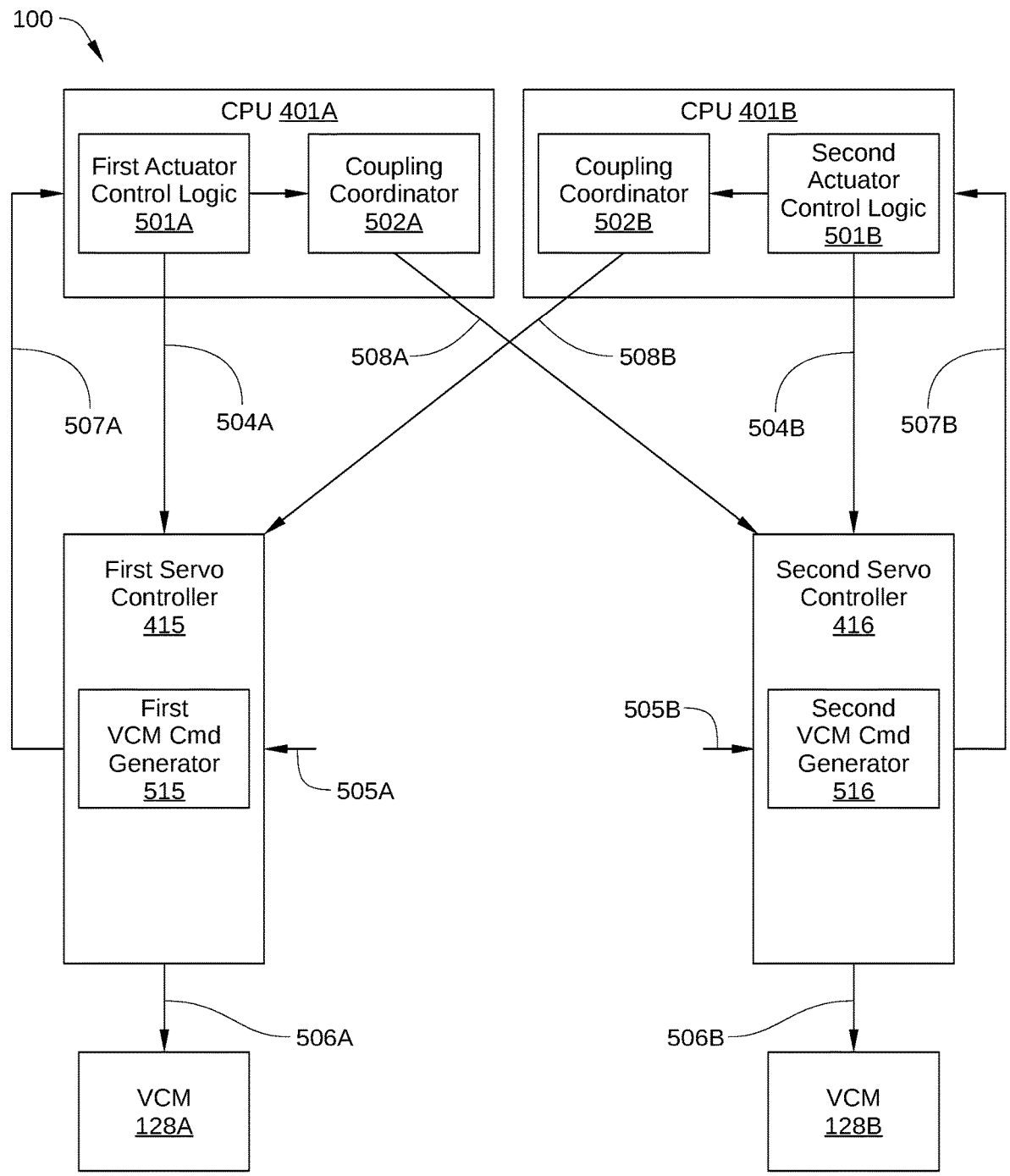
FIG. 5 is a schematic illustration of a control scheme that includes the use of a hold command, according to various embodiments.

FIG. 5 is a schematic illustration of a control scheme that includes the use of a hold command, according to various embodiments. As shown, CPU 401A implements first actuator control logic 501A and a coupling coordinator 502A, and CPU 401B second actuator control logic 501B and a coupling coordinator 502B. In conventional operation, first actuator control logic 501A issues high-level operation commands 504A to first servo controller 415, and second actuator control logic 501B issues high-level operation commands 504B to second servo controller 416. Each high-level operation command 504A issued to first servo controller 415 is a command that indicates a specific high-level operation to be performed by VCM 128A, and each high-level operation command 504B issued to second servo controller 416 is a command that indicates a specific high-level operation to be performed by VCM 128B.

Examples of the high-level operations indicated by high-level operation command 504A and high-level operation command 504B include a write operation, a rewrite operation (performed in response to a data track being partially overwritten by a write operation), a read operation, a calibration operation, a park heads operation, an unpark heads operation, an error recovery operation, a servo spiral write operation, a servo burst write operation, and the like. Such high-level operations may involve a position-trajectory seek, a velocity-based seek (in which a VCM is actuated so that a particular read/write head follows a specified velocity profile), a target back-EMF load, and/or other VCM operations, where the VCM operations are implemented via VCM commands 506A generated by first servo controller 415 or VCM commands 506B generated by second servo controller 416. In some embodiments, receipt of a high-level operation command 504A by first servo controller 415 causes first servo controller 415 to generate specific VCM commands 506A for VCM 128A to perform the high-level operation indicated by the high-level operation command 504A. Similarly, receipt of a high-level operation command 504B by second servo controller 416 causes second servo controller 416 to generate specific VCM commands 506B for VCM 128B to perform the high-level operation indicated by the high-level operation command 504B.

Alternatively or additionally, in some embodiments, a seek operation is considered a high-level operation. In such embodiments, the seek operation may be included in another high-level operation, such as a read operation, a write operation, etc. In such embodiments, the accelerations and decelerations associated with the seek operation can be considered a particular type of high-level operation that generates significant disturbances. It is noted that, in such embodiments, a high-level operation that is a disturbance-generating operation (i.e., a seek operation) can be included in another high-level operation that is a position-sensitive operation, such as a write operation. Thus, in such embodiments, an actuator can be considered an aggressor actuator at one time during a high-level operation and a victim actuator at another time during the high-level operation. In some embodiments, any seek operation is considered a high-level operation. In other embodiments, a seek operation that exceeds a threshold length (e.g., number of tracks) is considered a high-level operation, since larger accelerations and decelerations (and therefore larger disturbances) are associated with longer seek operations.

First servo controller 415 includes a first VCM command generator 515 that generates VCM commands 506A for VCM 128A. Specifically, first VCM command generator 515 generates VCM commands 506A based on the currently issued high-level operation command 504A, the current radial location of the read/write head being controlled by VCM 128A, and a PES associated with VCM 128A (for example a first actuator PES 505A). Similarly, second servo controller 416 includes a second VCM command generator 516 that generates VCM commands 506B for VCM 128B, based on high-level operation command 504B, the current radial location of the read/write head being controlled by VCM 128B, and a second actuator PES 505B.

Further, in some embodiments, first servo controller 415 is configured to communicate error events 507A to first actuator control logic 501A, and second servo controller 416 is configured to communicate error events 507B to second actuator control logic 501B. In such embodiments, a current high-level operation being performed by VCM 128A or VCM 128B can be interrupted in response to the error event, and a different high-level operation can be performed by way of recovering from the error event. For example, in response to an error event 507A that includes a servo-writing error, first servo controller 415 may halt the current high-level operation (e.g., a servo-writing operation) and initiate a "park heads" operation that involves a completely different series of VCM commands 506A than the current high-level operation.

Coupling coordinator 502A includes logic for determining whether a high-level operation to be performed by VCM 128A is a disturbance-generating operation, a position-sensitive operation that can be adversely affected by a disturbance-generating operation performed by VCM 128B, or neither. Coupling coordinator 502A is further configured to issue a hold command 508A to second servo controller 416 (or to second actuator control logic 501B in some embodiments) under certain circumstances. Similarly, coupling coordinator 502B includes logic for determining whether a high-level operation to be performed by VCM 128B is a disturbance-generating operation, a position-sensitive operation that can be adversely affected by a disturbance-generating operation performed by VCM 128A, or neither. Coupling coordinator 502B is further configured to issue a hold command 508B to first servo controller 415 (or to first actuator control logic 501A in some embodiments) under certain circumstances.

By way of example, in the embodiment illustrated in FIG. 5, the functionality of coupling coordinator 502A is shown implemented as part of CPU 401A and the functionality of coupling coordinator 502B is shown implemented as part of CPU 401B. In other embodiments, the functionality of coupling coordinator 502A and coupling coordinator 502B can be implemented via any other technically feasible configuration. Thus, the functionality of coupling coordinator 502A can be implemented as firmware included in CPU 401A and/or SoC 133A (not shown), software being executed by CPU 401A, and/or logic circuitry included in or associated with CPU 401A and/or SoC 133A. Similarly, the functionality of coupling coordinator 502B can be implemented as firmware included in CPU 401B and/or SoC 133B (not shown), software being executed by CPU 401B, and/or logic circuitry included in or associated with CPU 401B and/or SoC 133B.

According to various embodiments, the above-described operation of CPU 401A, CPU 401B, first servo controller 415, and/or second servo controller 416 of HDD 100 is in some instances modified via a coupling coordinator, such as coupling coordinator 502A and/or coupling coordinator 502B. One such embodiment is described below in conjunction with FIG. 6 and another such embodiment is described below in conjunction with FIG. 7.

Figure 6:
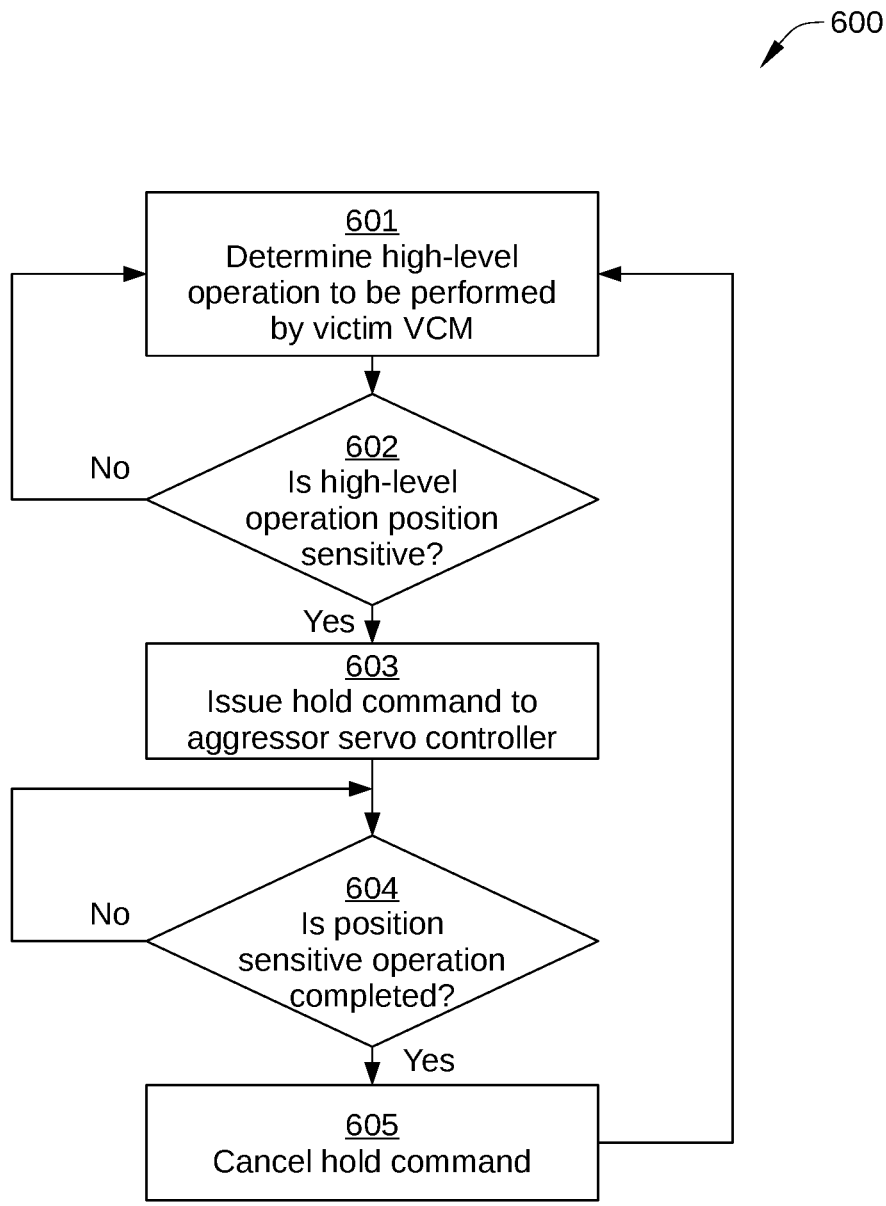
FIG. 6 sets forth a flowchart of method steps for reducing cross-coupling between actuators in a split actuator drive, according to an embodiment.

FIG. 6 sets forth a flowchart of method steps for reducing cross-coupling between actuators in a split actuator drive, such as HDD 100, according to an embodiment. Although the method steps are described in conjunction with HDD 100 of FIGS. 1-4, persons skilled in the art will understand that the method steps may be performed with other types of systems. The control algorithms for the method steps may reside in CPU 401A, SoC 133A, or a combination of both. Further, the control algorithms can be implemented in whole or in part as software- or firmware-implemented logic, and/or as hardware-implemented logic circuits.

A method 600 begins at step 601, when first actuator control logic 501A determines a high-level operation to be performed by VCM 128A, such as a read operation, a write operation, a self-servo-write process, a calibration operation, a recovery operation, and the like. In some embodiments, the high-level operation to be performed is determined based on a request or command from host 10 or in response to an error event 507A. Alternatively or additionally, in some embodiments, the high-level operation to be performed is determined based on a scheduled event, such as a planned calibration event or a procedure to be performed during manufacturing of HDD 100.

In step 602, coupling coordinator 502A determines whether the high-level operation determined in step 601 is a position-sensitive operation. If no, method 600 returns to step 601; if yes, method 600 proceeds to step 603. In some embodiments, a position-sensitive operation can be any high-level operation that can be adversely affected during execution by VCM 128B performing a disturbance-generating operation.

In step 603, coupling coordinator 502A issues a hold command 508A to second servo controller 416. Alternatively, in step 603, coupling coordinator 502A issues a hold command 508A to second actuator control logic 501B. In some embodiments, coupling coordinator 502A issues hold command 508A via an entry in a commonly accessible memory location, such as shared memory region 434 included in RAM 134, a specific register or other memory location in TCM 402B that is accessible by second servo controller 416 and/or second actuator control logic 501B, and the like. In some embodiments, coupling coordinator 502A can access RAM 134 and/or TCM 402B via bus 405 (TCM 402B and bus 405 are shown in FIG. 4). Alternatively or additionally, in some embodiments, coupling coordinator 502A issues hold command 508A by sending suitable communications through any technically feasible inter-CPU communication protocol that can be implemented by one of skill in the art, such as a dedicated port or inter-CPU interrupt.

In some embodiments, hold command 508A causes second actuator control logic 501B or second servo controller 416 to halt a current operation being performed by second servo controller 416. Alternatively, in some embodiments, hold command 508A causes second actuator control logic 501B or second servo controller 416 to suspend or delay issuing command for a disturbance-generating operation to be performed by second servo controller 416.

In some embodiments, in response to hold command 508A, second actuator control logic 501B or second servo controller 416 determines whether a current operation being performed by second servo controller 416 or an operation to be performed by second servo controller 416 is a disturbance-generating operation. In such embodiments, second actuator control logic 501B or second servo controller 416 makes such a determination based on one or more suitable attributes of the current operation or the operation to be performed, including a seek length associated with the operation, a predicted VCM current associated with the operation (based for example on a seek length or other motion of VCM 128B), a mechanical shock associated with the operation, an increased drag on storage disks 110 (from read/write heads) associated with the operation, an operation type associated with the operation, and/or the like.

In some embodiments, hold command 508A indicates a time interval during which second actuator control logic 501B does not issue commands to second servo controller 416 to perform a disturbance-generating command. Alternatively or additionally, in some embodiments, hold command 508A indicates a time interval during which second servo controller 415 does not generate VCM commands 506B for VCM 128B that are associated with a disturbance-generating operation. In such embodiments, the time interval may be based on a time required for completion of the position-sensitive operation by VCM 128A. Alternatively, in some embodiments, hold command 508A does not indicate a time interval. Instead, in such embodiments, second actuator control logic 501B does not issue commands to second servo controller 415 to perform a disturbance-generating command until coupling coordinator 502A cancels hold command 508A or issues a resume command. Alternatively, in some embodiments, second servo controller 415 does not generate VCM commands 506B for VCM 128B that are associated with a disturbance-generating operation until coupling coordinator 502A cancels hold command 508A or issues the resume command.

In step 604, coupling coordinator 502A determines whether the position-sensitive operation determined in step 601 is completed. If no, method 600 returns to step 604; if yes, method 600 proceeds to step 605.

In step 605, coupling coordinator 502A cancels hold command 508A. In some embodiments, coupling coordinator 502A cancels hold command 508A by issuing a resume command to second servo controller 416 and/or to second actuator control logic 501B, for example by changing a value in a commonly accessible memory location, such as shared memory region 434. Alternatively, in some embodiments, coupling coordinator 502A cancels hold command 508A when a time interval associated with hold command 508A expires. Method 600 then returns to step 601.

Method 600 as set forth above describes an embodiment in which VCM 128A is a victim actuator and VCM 128B is an aggressor actuator. It is noted that method 600 can be similarly applied to instances in which VCM 128B is a victim actuator and VCM 128A is an aggressor actuator, and coupling coordinator 502B issues hold command 508B to first servo controller 415.

Figure 7:
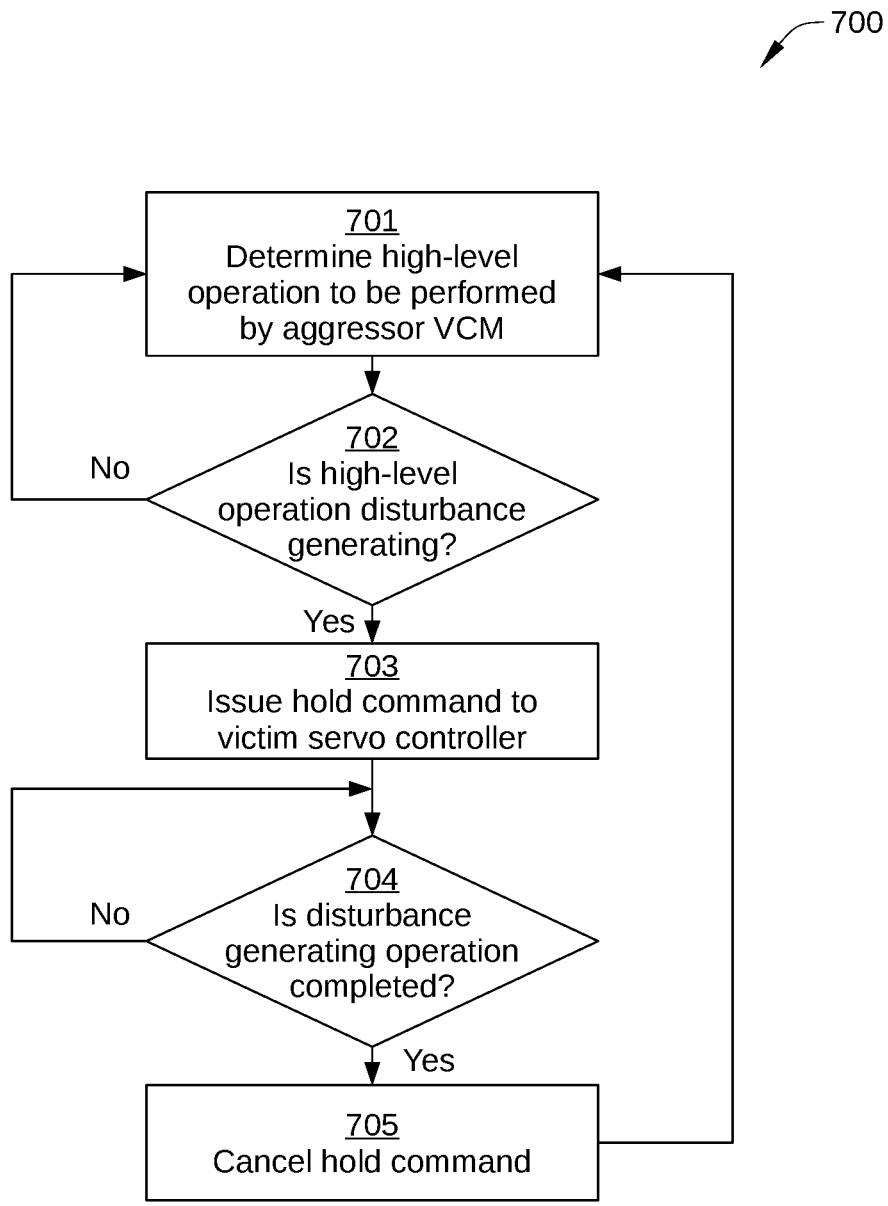
FIG. 7 sets forth a flowchart of method steps for reducing cross-coupling between actuators in a split actuator drive, according to an embodiment.

FIG. 7 sets forth a flowchart of method steps for reducing cross-coupling between actuators in a split actuator drive, such as HDD 100, according to an embodiment. Although the method steps are described in conjunction with HDD 100 of FIGS. 1-4, persons skilled in the art will understand that the method steps may be performed with other types of systems. The control algorithms for the method steps may reside in CPU 401A, SoC 133A, or a combination of both. Further, the control algorithms can be implemented in whole or in part as software- or firmware-implemented logic, and/or as hardware-implemented logic circuits.

A method 700 begins at step 701, when first actuator control logic 501A determines a high-level operation to be performed by VCM 128A, such as a read operation, a write operation, a self-servo-write process, a calibration operation, a recovery operation, and the like. In some embodiments, the high-level operation to be performed is determined based on a request or command from host 10 or in response to an error event 507A. Alternatively or additionally, in some embodiments, the high-level operation to be performed is determined based on a scheduled event, such as a planned calibration event or a procedure to be performed during manufacturing of HDD 100.

In step 702, coupling coordinator 502A determines whether the high-level operation determined in step 701 is a disturbance-generating operation. If no, method 700 returns to step 701; if yes, method 700 proceeds to step 703. In some embodiments, a disturbance-generating operation can be any high-level operation that can generate significant mechanical disturbances while being executed by VCM 128A. Thus, when a high-level operation is determined to be a disturbance-generating operation in step 702, VCM 128A is considered an aggressor actuator while the disturbance-generating operation is being executed.

In step 703, coupling coordinator 502A issues a hold command 508A to second servo controller 416. Alternatively, in step 703, coupling coordinator 502A issues a hold command 508A to second actuator control logic 501B. In some embodiments, coupling coordinator 502A issues hold command 508A via an entry in a commonly accessible memory location, such as shared memory region 434 included in RAM 134, a specific register or other memory location in TCM 402B that is accessible by second servo controller 416 and/or second actuator control logic 501B, and the like. In some embodiments, the implementation of hold command 508A in step 703 is similar to that of hold command 508A in step 603 of method 600, except that in step 703, hold command 508A prevents VCM commands 506B from being issued to VCM 128B that are associated with a position-sensitive operation. Thus, in method 700, hold command 508A prevents a victim actuator (i.e., VCM 128B) from performing position-sensitive operations while an aggressor actuator (i.e., VCM 128A) is performing disturbance-generating operations.

In step 704, coupling coordinator 502A determines whether the disturbance-generating operation determined in step 701 is completed. If no, method 700 returns to step 704; if yes, method 700 proceeds to step 705.

In step 705, coupling coordinator 502A cancels hold command 508A. In some embodiments, coupling coordinator 502A cancels hold command 508A in the same way described above in step 605 of method 600.

Method 700 as set forth above describes an embodiment in which VCM 128A is an aggressor actuator and VCM 128B is a victim actuator. It is noted that method 700 can be similarly applied to instances in which VCM 128B is an aggressor actuator and VCM 128B is a victim actuator, and coupling coordinator 502B issues hold command 508B to first servo controller 415. Further, method 700 can be employed in HDD 100 in conjunction with method 600.

In the embodiments described above in conjunction with FIGS. 5, 6, and 7, the functionality of a coupling coordinator is implemented in CPU 401A and CPU 401B. Additionally or alternatively, in some embodiments, functionality of a coupling coordinator is implemented in first servo controller 415 and second servo controller 416. In such embodiments, a hold command can be issued from one servo controller to another servo controller of a multi-actuator drive. One such embodiment is described below in conjunction with FIGS. 8 and 9.

Figure 8:
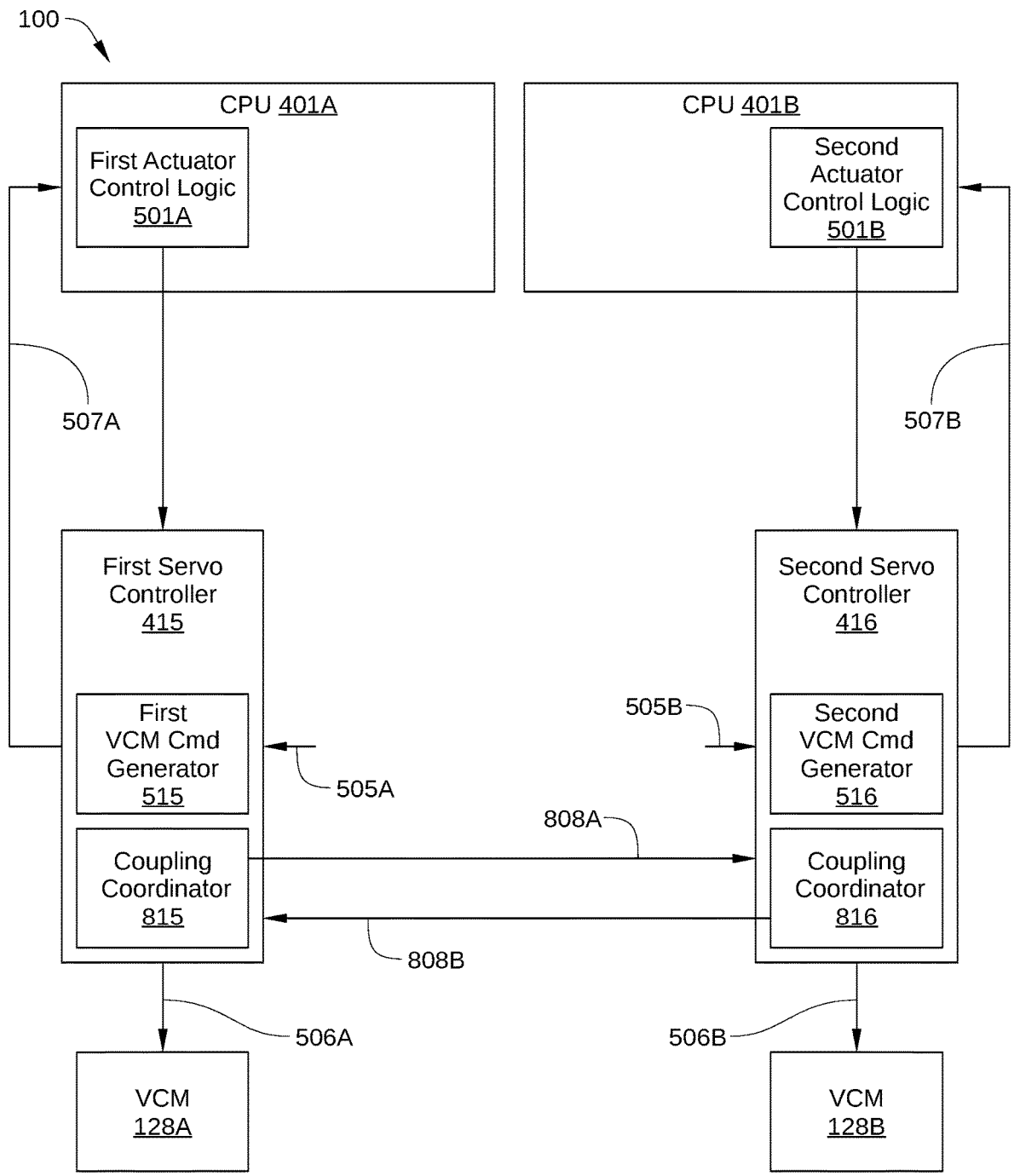
FIG. 8 is a schematic illustration of a control scheme that includes the use of a hold command, according to various embodiments.

FIG. 8 is a schematic illustration of a control scheme that includes the use of a hold command, according to various embodiments. As shown, first servo controller 415 includes a coupling coordinator 815, and second servo controller 416 includes a coupling coordinator 816. Coupling coordinator 815 includes logic (e.g., firmware-implemented logic and/or hardware-implemented logic circuits) for determining whether certain error conditions have been met in first servo controller 415 and, in response, issuing a hold command 808A to second servo controller 416. For example, coupling coordinator 815 may issue hold command 808A until the error conditions are no longer in effect and/or recovery therefrom is completed. Similarly, coupling coordinator 816 includes logic for determining whether certain error conditions have been met in second servo controller 416 and, in response, issuing a hold command 808B to first servo controller 415. For example, coupling coordinator 816 may issue hold command 808B until the error conditions are no longer in effect and/or recovery therefrom is completed.

In operation, an error event detected by first servo controller 415 causes coupling coordinator 815 to issue a hold command 808A to second servo controller 416, and an error event detected by second servo controller 416 causes coupling coordinator 816 to issue a hold command 808B to first servo controller 415. One such embodiment is described below in conjunction with FIG. 9.

Figure 9:
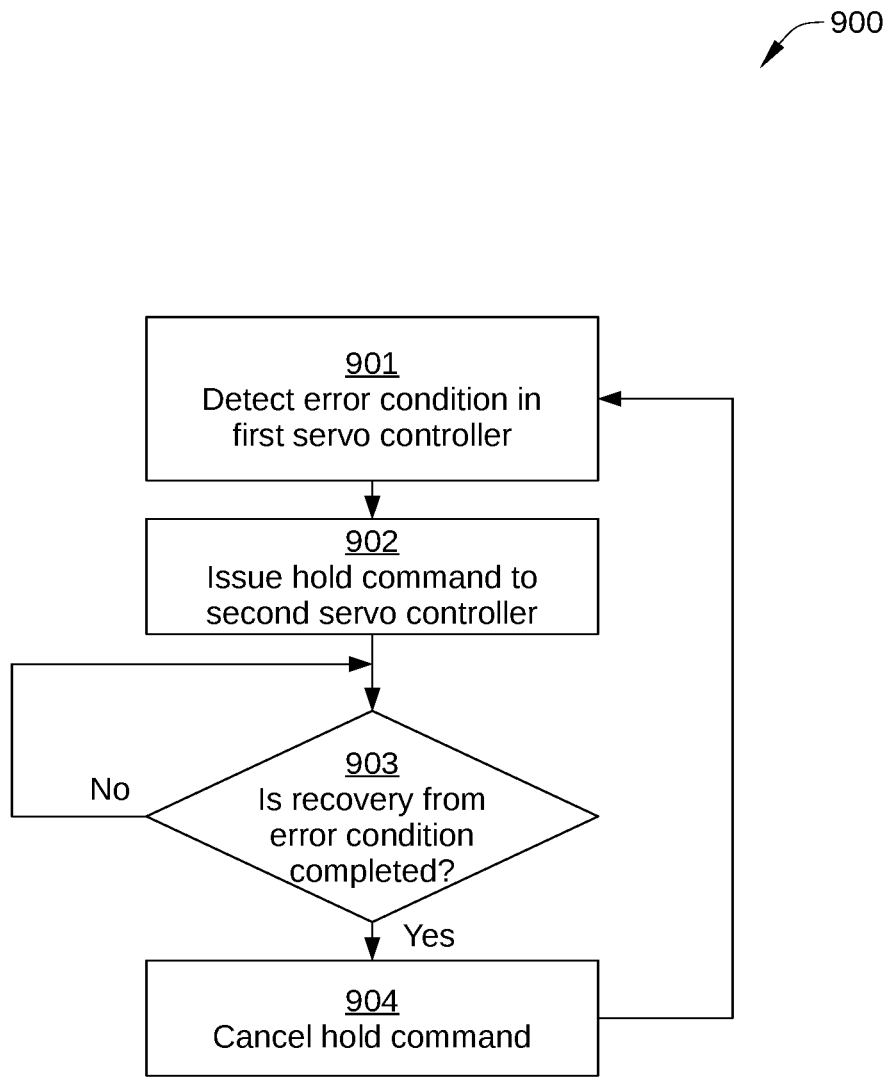
FIG. 9 sets forth a flowchart of method steps for reducing cross-coupling between actuators in a split actuator drive, according to an embodiment.

FIG. 9 sets forth a flowchart of method steps for reducing cross-coupling between actuators in a split actuator drive, such as HDD 100, according to an embodiment. Although the method steps are described in conjunction with HDD 100 of FIGS. 1-4, persons skilled in the art will understand that the method steps may be performed with other types of systems. In some embodiments, the control algorithms for the method steps reside in coupling coordinator 815. Further, the control algorithms can be implemented in whole or in part as software- or firmware-implemented logic, and/or as hardware-implemented logic circuits.

A method 900 begins at step 901, when coupling coordinator 815 detects an error condition in first servo controller 415. For example, in some embodiments, the error condition is a servo writing error or other error condition for which recovery includes a parking of the heads associated with VCM 128A and/or motion of a portion of the actuator associated with VCM 128A against a crash stop.

In step 902, coupling coordinator 815 issues a hold command 808A to second servo controller 416. In some embodiments, coupling coordinator 815 issues hold command 808A via an entry in a commonly accessible memory location, such as shared memory region 434 included in RAM 134, a specific register or other memory location in TCM 402B that is accessible by second servo controller 416. Similar to hold command 508A of FIG. 5, in some embodiments, hold command 808A indicates a time interval during which second servo controller 416 does not generate VCM commands 506B for VCM 128B that are associated with a position-sensitive operation. Alternatively or additionally, in some embodiments, hold command 808A does not indicate a time interval. Instead, in such embodiments, second servo controller 416 does not issue VCM commands 506B to VCM 128B that are associated with a position-sensitive operation until coupling coordinator 815 cancels hold command 808A or issues a resume command to second servo controller 416.

In step 903, coupling coordinator 815 determines whether recovery from the error condition detected in step 901 is completed. If no, method 900 returns to step 903; if yes, method 900 proceeds to step 904.

In step 904, coupling coordinator 815 cancels hold command 808A. In some embodiments, coupling coordinator 815 cancels hold command 808A by issuing a resume command to second servo controller 416, for example by changing a value in a commonly accessible memory location, such as shared memory region 434. Alternatively, in some embodiments, coupling coordinator 815 cancels hold command 808A when a time interval associated with hold command 808A expires. Method 900 then returns to step 901.

Method 900 as set forth above describes an embodiment in which VCM 128A is an aggressor actuator and VCM 128B is a victim actuator. It is noted that method 900 can be similarly applied to instances in which VCM 128B is an aggressor actuator and VCM 128A is a victim actuator, and coupling coordinator 816 issues hold command 808B to first servo controller 415.

According to various embodiments described herein, cross-actuator coupling in a multi-actuator drive is avoided via a hold command generated within the drive. In some embodiments, the hold command prevents an aggressor actuator from performing a disturbance-generating operation while a victim actuator performs a position-sensitive operation. In other embodiments, the hold command prevents a victim actuator from performing a position-sensitive operation while an aggressor actuator performs a disturbance-generating operation. In either case, errors and/or corrupted data caused by a victim actuator being disturbed during a position-sensitive operation is avoided, thereby reducing or eliminating the need for repeating the position-sensitive operation and/or correcting errors associated with a disturbed operation. As a result operations of a multi-actuator drive are improved in performance and reliability.

While the foregoing is directed to embodiments of the present invention, other and further embodiments of the invention may be devised without departing from the basic scope thereof, and the scope thereof is determined by the claims that follow.

We claim:

1. A method of reducing cross-coupling between actuators in a split actuator drive, wherein the actuators include a first actuator that is controlled by a first controller and a second actuator that is controlled by a second controller, said method comprising:
generating a hold command for the second controller based on an operation to be carried out using the first actuator, before issuing commands to carry out the operation;
issuing the hold command to the second controller; and
after issuing the hold command to the second controller, issuing the commands to carry out the operation,
wherein the hold command issued to the second controller causes the second controller to determine whether an operation to be carried out using the second actuator includes a disturbance-generating operation and to suspend issuing commands for the disturbance-generating operation.

2. The method of claim 1, wherein the hold command to the second controller causes the second controller to suspend issuing the commands for the disturbance-generating operation while the operation to be carried out using the first actuator is carried out.

3. The method of claim 1, wherein the first controller generates the hold command.

4. The method of claim 1, wherein the first controller generates the hold command in response to detecting an error associated with the servo system of the first actuator.

5. The method of claim 1, wherein the first controller is included in a first servo system for the first actuator and the second controller is included in a second servo system for the second actuator.

6. The method of claim 1, wherein control logic external to the first controller generates the hold command.

7. The method of claim 6, wherein the control logic generates the hold command in response to determining that a high-level command is to be executed by the first controller.

8. The method of claim 7, further comprising, after generating the hold command, issuing, by the control logic, the high-level command to the first controller.

9. The method of claim 6, wherein the high-level command includes one or more disturbance-generating operations.

10. The method of claim 6, wherein the hold command indicates a time interval during which the second controller suspends issuing commands associated with the operation to be performed-by-carried out using the second actuator.

11. The method of claim 6, further comprising:
determining that the operation to be carried out using the first actuator is completed by the first actuator; and
in response, canceling the hold command for the second controller.

12. The method of claim 11, wherein the second controller is configured to perform an operation in response to the hold command being canceled.

13. A disk device, comprising:
a magnetic disk;
first and second heads;
a first arm to which the first head is mounted;
a second arm to which the second head is mounted;
a first control circuit configured to generate a first control signal for moving the first arm in response to a first position signal generated by the first head; and
a second control circuit configured to generate a second control signal for moving the second arm in response to a second position signal generated by the second head,
wherein the first control circuit is configured to:
generate a hold command for the second control circuit based on an operation to be carried out using the first head, before issuing commands to carry out the operation;
issue the hold command to the second control circuit; and
after issuing the hold command to the second control circuit, issuing the commands to carry out the operation,
wherein the hold command issued to the second control circuit causes the second control circuit to determine whether an operation to be carried out using the second head includes a disturbance-generating operation and to suspend issuing commands for the disturbance-generating operation.

14. The disk device of claim 13, wherein the first control circuit includes a first processor and a first servo controller that generates the first control signal based on the first position signal and an instruction from the first processor, and the second control circuit includes a second processor and a second servo controller that generates the second control signal based on the second position signal and an instruction from the second processor.

15. The disk device of claim 14, wherein the hold command is generated by the first processor and issued to the second servo controller.

16. The disk device of claim 14, wherein the hold command is generated by the first servo controller and issued to the second servo controller.

* * * * *